US012737627B2

(12) United States Patent
Zhu et al.

(10) Patent No.: US 12,737,627 B2
(45) Date of Patent: Sep. 15, 2026

(54) DATA CACHING METHOD AND APPARATUS FOR MULTIPLE CONCURRENT DEEP LEARNING TRAINING TASKS

(71) Applicant: Zhejiang Lab, Zhejiang (CN)

(72) Inventors: Chunjie Zhu, Zhejiang (CN); Fang Zhou, Zhejiang (CN); Zhihang Tang, Zhejiang (CN); Yi Qin, Zhejiang (CN); Qiming Fang, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 586 days.

(21) Appl. No.: 18/348,362

(22) Filed: Jul. 7, 2023

(65) Prior Publication Data

US 2023/0394307 A1 Dec. 7, 2023

Related U.S. Application Data

(63) Continuation of application No. PCT/CN2022/114385, filed on Aug. 24, 2022.

(30) Foreign Application Priority Data

Jun. 7, 2022 (CN) ......................... 202210632036.6

(51) Int. Cl.
*G06Q 20/00* (2012.01)
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS 10,891,156 B1 * 1/2021 Zhao ..................... G06F 9/4881
11,373,062 B1 * 6/2022 Wang .................... G06F 18/214
(Continued)

FOREIGN PATENT DOCUMENTS

CN 109101339 12/2018
CN 112379849 2/2021
CN 112416368 2/2021

OTHER PUBLICATIONS

Thanrindu; Event Prediction in Processors Using Deep Temporal Models; IEEE 2018; pp. 29-33; 2018.*
(Continued)

*Primary Examiner* — Radu Andrei
(74) *Attorney, Agent, or Firm* — JCIPRNET

(57) ABSTRACT

Disclosed are a data caching method and apparatus for multiple concurrent deep learning training tasks. The method includes: step 1, executing preheating training for each task, collecting feature parameters of training batch samples, and sorting all the tasks according to the collected feature parameters; step 2, calculating the sample number of each training batch hit in a cache of each task under system pre-allocation, and the expected sample number of each training batch hit in the cache of each task; step 3, concurrently executing deep learning training by using a cache dynamic allocation and management strategy; and step 4, when each task enters a last training epoch, adding no new sample data to the caches of these tasks, gradually releasing the occupied cache, and making the released cache to be used by other tasks that are not finished.

7 Claims, 5 Drawing Sheets

(56) References Cited

U.S. PATENT DOCUMENTS

| | | | | |
|---|---|---|---|---|
| 12,522,798 | B2 * | 1/2026 | Tran | C12M 41/36 |
| 2015/0040669 | A1 * | 2/2015 | Borkholder | G01P 15/14<br>73/514.35 |
| 2016/0232091 | A1 * | 8/2016 | Wang | G06F 12/0875 |
| 2016/0239344 | A1 * | 8/2016 | Wang | G06F 12/0846 |
| 2019/0065251 | A1 * | 2/2019 | Wen | G06F 9/5027 |
| 2020/0167658 | A1 * | 5/2020 | Du | A61B 5/0006 |
| 2020/0319922 | A1 * | 10/2020 | Cui | G06F 9/5011 |
| 2020/0348965 | A1 * | 11/2020 | Chenxi | G06N 3/098 |
| 2021/0042155 | A1 * | 2/2021 | Wang | G06F 9/5016 |
| 2021/0232498 | A1 * | 7/2021 | Zhang | G06F 11/3608 |
| 2021/0256418 | A1 | 8/2021 | Creedon et al. | |
| 2021/0256423 | A1 * | 8/2021 | Zhou | G06N 3/0499 |
| 2021/0319312 | A1 * | 10/2021 | Malaya | G06F 17/17 |
| 2022/0207643 | A1 * | 6/2022 | Puthoor | G06T 1/20 |
| 2022/0229695 | A1 * | 7/2022 | Ferreira | G06F 9/5027 |
| 2022/0277565 | A1 * | 9/2022 | Haro | G06V 20/46 |
| 2023/0111370 | A1 * | 4/2023 | Tran | C12M 41/36<br>382/133 |

OTHER PUBLICATIONS

Wang; DIESEL+_ Accelerating Distributed Deep Learning Tasks on Image Datasets; IEEE 2022; pp. 1173-1184.*

* cited by examiner

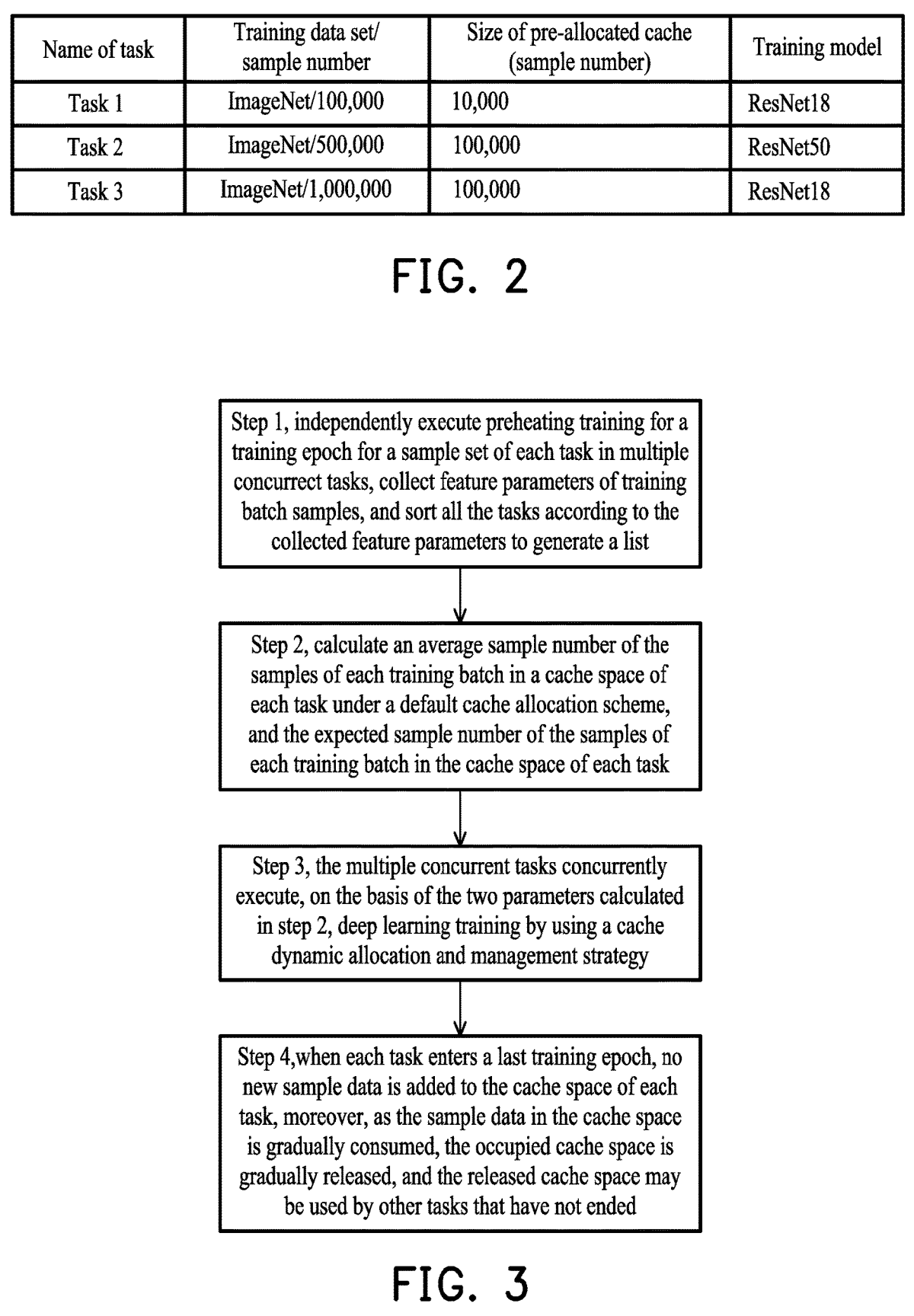

| Name of task | Training data set/ sample number | Size of pre-allocated cache (sample number) | Training model |
|---|---|---|---|
| Task 1 | ImageNet/100,000 | 10,000 | ResNet18 |
| Task 2 | ImageNet/500,000 | 100,000 | ResNet50 |
| Task 3 | ImageNet/1,000,000 | 100,000 | ResNet18 |

FIG. 2

Step 1, independently execute preheating training for a training epoch for a sample set of each task in multiple concurrect tasks, collect feature parameters of training batch samples, and sort all the tasks according to the collected feature parameters to generate a list Step 2, calculate an average sample number of the samples of each training batch in a cache space of each task under a default cache allocation scheme, and the expected sample number of the samples of each training batch in the cache space of each task Step 3, the multiple concurrent tasks concurrently execute, on the basis of the two parameters calculated in step 2, deep learning training by using a cache dynamic allocation and management strategy Step 4,when each task enters a last training epoch, no new sample data is added to the cache space of each task, moreover, as the sample data in the cache space is gradually consumed, the occupied cache space is gradually released, and the released cache space may be used by other tasks that have not ended

FIG. 3

DATA CACHING METHOD AND APPARATUS FOR MULTIPLE CONCURRENT DEEP LEARNING TRAINING TASKS

CROSS-REFERENCE TO RELATED APPLICATION

This application is a continuation of international PCT application serial no. PCT/CN2022/114385, filed on Aug. 24, 2022, which claims the priority benefit of China application no. 202210632036.6, filed on Jun. 7, 2022. The entirety of each of the above mentioned patent applications is hereby incorporated by reference herein and made a part of this specification.

BACKGROUND

Technical Field

The present disclosure relates to the field of deep learning, and in particular to a data caching method and apparatus for multiple concurrent deep learning training tasks.

Description of Related Art

As an important branch for machine learning, performance optimization of deep learning is always a research hotspot in recent years. A deep learning training task covers a plurality of stages such as data I/O, central processing unit (CPU) calculation and graphics processing unit (GPU) calculation, and the I/O bottleneck problem of deep learning training is increasingly obvious with continuous and rapid improvement of the performance of assemblies such as a CPU and a GPU.

A caching technology is an important means for relieving and eliminating an I/O bottleneck, but existing caching for deep learning training has an excessive hit problem. Specifically, during a training epoch, sample hits in a cache by some training batches have a large proportion, such that time of a data loading stage of these batches is significantly shorter than that of a data augmentation stage or a model training stage. However, the situations of the other batches are opposite, since the situation of unbalanced cache use exists, the previous part of batches waste a limited cache resource, and such a phenomenon is referred to as an excessive hit of the cache.

In addition, cases of concurrent execution of a plurality of deep learning training tasks are increasingly common, and these tasks are independent of each other, and are likely to use different data sets, perform different augmentation operations, and use different models for training. When these tasks are executed concurrently, a common method is to pre-allocate a cache to each task according to a predetermined proportion according to the data set size. However, a cache utilization rate of a static cache allocation scheme needs to be improved: firstly, the cache size required by the task depends not only on the size of the data set, but also the time overhead of the data augmentation stage and the model training stage of the task need to be considered; and secondly, the deep learning training has periodicity, and average interval time when the samples of different tasks are referenced twice is often different, such that average residence time of the samples of different tasks in the cache is also different, and the utilization rate of a global cache can be further improved by using such a rule to dynamically allocate the cache among the multiple tasks.

The cache design problem for concurrent deep learning training is a research hotspot at present, the most representative work is Quiver, which ensures that all concurrent tasks can quickly acquire samples from the cache by utilizing substitutability of the samples, such that the time overhead of the I/O stage of the tasks is reduced, and the I/O bottlenecks of the tasks are relieved. However, Quiver has obvious defects. On the one hand, its applicable application scenario is very narrow, that is, multiple tasks sharing the cache need to use the same data set; and on the other hand, the global randomness of sample access of each task during each epoch is destroyed, which is likely to cause adverse influence on the accuracy of model training. Therefore, how to dynamically allocate and manage a cache for multiple concurrent deep learning training tasks becomes an urgent problem to be solved.

SUMMARY

In order to solve the above technical problems existing in the prior art, the present disclosure provides a data caching method and apparatus for multiple concurrent deep learning training tasks, which dynamically allocate and mange a cache for the concurrent deep learning training tasks, and improve the utilization rate of the cache of each task by solving the excessive hit problem, thereby relieving and eliminating the I/O bottlenecks in the deep learning training tasks to the maximum extent. The specific technical solutions are as follows:

A data caching method for multiple concurrent deep learning training tasks includes the following steps:

step 1, independently executing preheating training for a training epoch on a sample set of each one of multiple concurrent tasks, collecting feature parameters of training batch samples, and sorting all the tasks according to the collected feature parameters to generate a list;

step 2, calculating an average sample number of each training batch hit in a cache of each task under a default cache allocation plan, and the expected sample number of each training batch hit in the cache of each task;

step 3, on the basis of the two parameters calculated in step 2, concurrently executing deep learning training by multiple tasks by using a cache dynamic allocation and management strategy; and step 4, when each task enters a last training epoch, adding no new sample data to the cache of each task, moreover, with the sample data in the cache being gradually consumed, gradually releasing the occupied cache, and making the released cache to be used by other tasks that are not finished.

Furthermore, step 1 specifically includes the following substeps:

step S11, acquiring an initial parameter configuration, where the total number of the concurrent tasks is denoted as M, for the tasks $task_i$, $i \in [0, M)$ therein, the total number of samples contained in the used data set is denoted as $D_i$, the number of samples contained in one training batch is denoted as $N_i$, and the maximum number of samples that are stored in a system pre-allocated cache is denoted as $C_i$;

step S12, since preheating training does not use any cache, when preheating training of each task is completed, counting information thereof, where time required by the task $task_i$ to independently execute one training epoch is denoted as $$T_i^{epoch},$$

I/O average time for loading one training batch is denoted as $$T_i^{io},$$

average time for loading one sample is denoted as $$T_i^{sample},$$

average time for augmenting one training batch is denoted as $$T_i^{aug},$$

and average time for training one training batch is denoted as $$T_i^{tr};$$

and step S13, sorting all the tasks in an ascending order to obtain an ordered task list according to the time $$T_i^{epoch}$$

required by the task $task_i$ to execute one training epoch and acquired in step S12:

List<$task_{k_1}$, $task_{k_2}$, . . . , $task_{k_M}$>, where each task $task_{k_i}$, i, $k_i \in [0, M)$ in the list contains a parameter $factor_{k_i}$ serving as a gain coefficient for the task to apply for a cache from a free cache pool, that is, whenever the task applies for space for one sample from the free cache pool, the free cache pool allocates ($1+factor_{k_i}$) times cache to the task, moreover, the value of $factor_{k_i}$ is inversely related to $$T_{k_i}^{epoch},$$

and $factor_{k_M}=0$.

Furthermore, step 2 specifically includes the following substeps:

step S21, calculating the sample number $$n_{k_i}^d$$

of each training batch hit in the cache of each task $task_{k_i}$ under the default cache allocation scheme, namely a system pre-allocated situation, where an expression is:

$$n_{k_i}^d = \left\lceil \frac{N_{k_i} * C_{k_i}}{D_{k_i}} \right\rceil,$$

$D_{k_i}$ refers to the total number of the samples contained in the used data set of the task $task_{k_i}$ after sorting, $N_{k_i}$ refers to the number of the samples contained in one training batch of the task $task_{k_i}$ after sorting, and $C_{k_i}$ refers to the number of the samples stored in the system pre-allocated cache of the task $task_{k_i}$ after sorting; and step S22, calculating the expected sample number $$n_{k_i}^e$$

of each training batch hit in the cache of each task $task_{k_i}$, where an expression is:

$$n_{k_i}^e = \left\lceil \frac{T_{k_i}^{io} - \max\{T_{k_i}^{aug}, T_{k_i}^{tr}\}}{T_{k_i}^{sample}} \right\rceil.$$

Furthermore, step 3 specifically includes the following substeps:

step S31, forming a global free cache pool from the free caches of the multiple concurrent tasks, where the total size of the global free cache pool is denoted as totalMem, the cache of each task is logically divided into two portions, denoting as $$\text{Cache}_{k_i}^{cur} \text{ and } \text{Cache}_{k_i}^{next},$$

the sample which enters the cache in the previous training epoch and is to be used in the current training epoch is stored in $$\text{Cache}_{k_i}^{cur},$$

the sample which enters the cache in the current training epoch and is to be used in the next training epoch is stored in $$\text{Cache}_{k_i}^{next},$$

and the global free cache pool totalMem in an initial situation is calculated by means of the following formula:

$$totalMem = \sum_{k_i=1}^{M} C_{k_i},$$

step S32, the task $task_{k_i}$ holding two sample access sequences in each training epoch, where one sample access sequence indicates the sample access sequence in the current training epoch and is denoted as $s_{k_i}^{cur}$, the other sample access sequence indicates the sample access sequence in the next training epoch and is denoted as $s_{k_i}^{next}$, the $S_{k_i}^{next}$ is sequentially divided into different sequence segments from the beginning to end, each segment corresponds to a training batch, each segment is configured with a counter so as to record the number of the samples entering the cache in the current training epoch of the training batch, all the counters of the task are reset when one training epoch starts, and then step S33 is executed;

step S33, if the sample $S_{k_i}^{cur}[j]$, j∈[0, $D_{k_i}$) requested by the task $task_{k_i}$ is hit in the cache $Cache_{k_i}^{cur}$, acquiring the hit sample from $Cache_{k_i}^{cur}$, adding one to totalMem of the free cache pool, otherwise, loading the sample from the bottom layer storage system, and then executing step S34;

step S34, retrieving a requested sample $S_{k_i}^{cur}[j]$ in the sample access sequence $S_{k_i}^{next}$ in the next training epoch of the task $task_{k_i}$, calculating the training batch to which the requested sample $S_{k_i}^{cur}[j]$ belongs in the next training epoch, denoting the training batch as $batch_{k_i}^{x}$, then, acquiring a counter value of the training batch $batch_{k_i}^{x}$, and denoting the value as $n_{k_i}^{x}$, and executing step S35;

step S35, when totalMem≤0 and $Cache_{k_i}^{next}$ has no free space, executing step S36, when totalMem>0, if $n_{k_i}^{x} < n_{k_i}^{e}$, the task $task_{k_i}$ applying for a space from the free cache pool to $Cache_{k_i}^{next}$ according to its gain coefficient (if the cache pool is empty, application fails), then inserting the requested sample $S_{k_i}^{cur}[j]$ into $Cache_{k_i}^{next}$, then adding one to $n_{k_i}^{x}$, updating totalMem, and executing step S38; if $n_{k_i}^{x} \geq n_{k_i}^{e}$, $S_{k_i}^{cur}[j]$ not entering the cache of the task $task_{k_i}$, and executing step S38;

step S36, if $$n_{k_i}^x \geq n_{k_i}^d,$$

the requested sample $$S_{k_i}^{cur}[j]$$

not entering the cache of the task $task_{k_i}$, and executing step S38; if $$n_{k_i}^x < n_{k_i}^d,$$

executing step S37;

step S37, if $$Cache_{k_i}^{next}$$

of the task $task_{k_i}$ contains free space, the sample $$S_{k_i}^{cur}[j]$$

entering $$Cache_{k_i}^{next},$$

and executing step S38; otherwise, if the task $task_{k_i}$ is the first task (i.e. i=0) in the list List, the requested sample $$S_{k_i}^{cur}[j]$$

not entering the cache of $task_{k_i}$, and executing step S38; otherwise, requiring $$Cache_{k_{i-1}}^{next}$$

of the previous task $task_{k_{i-1}}$ in the list List to provide free space to $$Cache_{k_i}^{next},$$

specifically, if $$Cache_{k_{i-1}}^{next}$$

contains free space, directly moving the free space of one unit to $$Cache_{k_i}^{next},$$

otherwise, randomly selecting one of the samples in the $$Cache_{k_{i-1}}^{next}$$

for elimination, subtracting one from the counter of the training batch corresponding to the eliminated sample, then, moving the empty cache to $$Cache_{k_i}^{next},$$

inserting the sample $$S_{k_i}^{cur}[j]$$

into $$Cache_{k_i}^{next},$$

adding one to the counter of the corresponding training batch, and executing step S38;

step S38, the requested sample $$S_{k_i}^{cur}[j]$$

of the task $task_{k_i}$ entering a subsequent augmentation stage and a model training stage; and step S39, after the task $task_{k_i}$ has completed training of the current training epoch, if training of all the training periods has been completed, ending the task $task_{k_i}$, otherwise, executing step S32 for training of the next training epoch of the task $task_{k_i}$.

Furthermore, the caches of all the tasks in the multiple concurrent tasks are isolated from each other, and only the samples in the respective cache are allowed to be accessed.

Furthermore, for each task in the current training epoch, the samples entering the cache are relatively uniformly distributed in all training batches of the next training epoch, the front task in the list applies for a free cache from the free cache pool at a faster speed, and the rear task is allowed to forcibly request other tasks located in front of the rear task in the list to return partial cache.

A data caching apparatus for multiple concurrent deep learning training tasks includes one or more processors and is configured to implement the data caching method for multiple concurrent deep learning training tasks.

A computer readable storage medium has a program stored thereon, where the program implements, when executed by a processor, the data caching method for multiple concurrent deep learning training tasks.

The present disclosure has the advantages and beneficial effects as follows:

The present disclosure designs a cache dynamic allocation and management strategy for the multiple concurrent deep learning training tasks, and for any one of the training tasks, the present disclosure accurately selects samples entering the cache in each training epoch, such that the samples are uniformly distributed in all training batches of the next training epoch as much as possible, thereby solving the problem of excessive hit of the cache of each task, and improving the utilization rate of the cache. Based on the foregoing, the present disclosure designs a real-time dynamic cache allocation strategy for the multiple concurrent training tasks, such that any task may lend the cache to other tasks at proper time, and borrow the cache from other tasks when the cache is needed, thereby fully utilizing the caches of all the concurrent tasks, ensuring that the actually utilized cache of each task is not smaller than the cache pre-allocated by the system, and further improving the utilization rate of the global cache.

BRIEF DESCRIPTION OF THE DRAWINGS

FIG. 2 is a schematic diagram of main parameter configurations of multiple concurrent deep learning training tasks of an example of the present disclosure.

FIG. 3 is a schematic flow diagram of a data caching method for multiple concurrent deep learning training tasks of an example of the present disclosure.

DESCRIPTION OF THE EMBODIMENTS

In order to make the objective, the technical solutions and the technical effects of the present disclosure more clear, the present disclosure is further described in detail with reference to the accompanying drawings and examples of the description.

Figure 1:
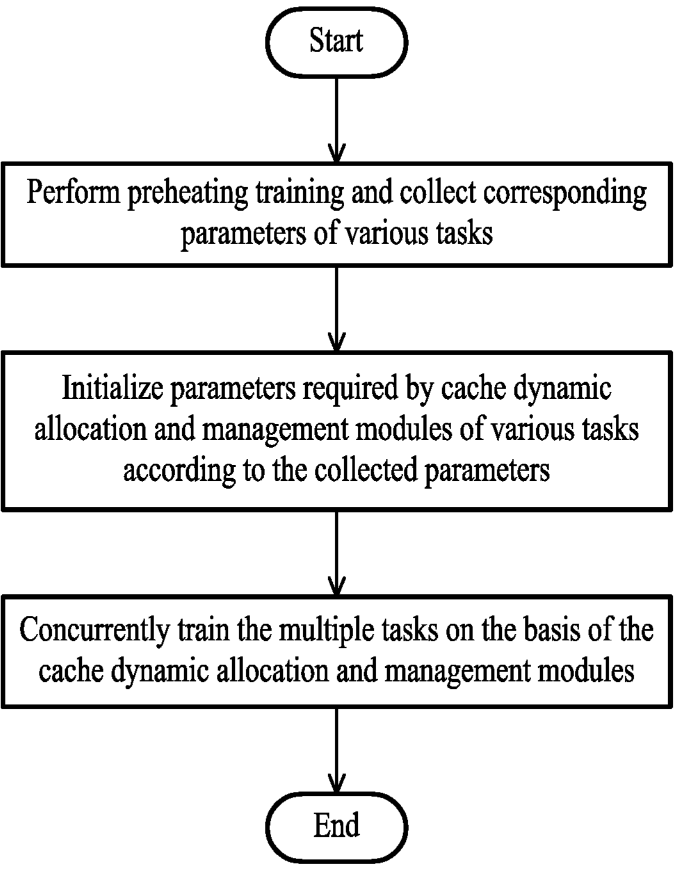
FIG. 1 is a schematic diagram of a training process of multiple concurrent tasks based on a cache dynamic allocation and management strategy of the present disclosure.

A cache dynamic allocation and management method for multiple concurrent deep learning training tasks has an objective of improving a utilization rate of the deep learning training tasks to a cache, accelerating data loading stages of all the tasks by means of the cache, and relieving or eliminating the I/O bottlenecks of the tasks. As shown in FIG. 1, in the method, feature parameters of all tasks are collected by means of preheating training, then, a cache allocation and management strategy is configured and initialized on the basis of these parameters, and finally, the multiple tasks execute concurrent training on the basis of the real-time cache dynamic allocation and management strategy.

According to the method proposed by the present disclosure, the caches of different tasks are isolated from each other, and for each task in the current training epoch, it is ensured that the cached and received samples are uniformly distributed in all training batches of the next training epoch as much as possible, thereby solving the problem of excessive hit of the cache. Moreover, the method allocates cache resources in real time among different tasks, such that firstly, an unbalanced problem caused by a default cache static pre-allocation strategy is solved, and secondly, the utilization rate of the whole cache is improved by utilizing the features of the tasks.

The apparatus of the present disclosure may be deployed on a Pytorch platform, on a single physical node, each concurrent deep learning training task has an independent graphics processing unit (GPU) and central processing unit (CPU), an ImageNet data set is used, a trained model is ResNet, and a main parameter configuration is shown in FIG. 2. In this scenario, the method of the present disclosure includes, as shown in FIG. 3, the following steps.

Step 1, preheating training for a training epoch for a sample set of each one of the multiple concurrent tasks is independently executed, feature parameters of training batch samples are collected, and all the tasks are sorted according to the collected feature parameters to generate a list, which specifically includes the following substeps.

Step S11, an initial parameter configuration is acquired, where the total number of the concurrent tasks is M, in this example, a value of M is three, for the tasks $task_i$ therein, $i \in M$, the total number of samples contained in the used data set is denoted as $D_i$, the number of samples contained in one training batch is denoted as $N_i$, and the number of samples that may be stored in a system pre-allocated cache is denoted as $C_i$.

Step S12, when preheating training of each task is completed, information is counted thereof, where time required by the task to independently execute one training epoch is denoted as $$T_i^{epoch},$$

I/O average time for loading one training batch is denoted as $$T_i^{io},$$

average time for loading one sample is denoted as $$T_i^{sample},$$

average time for augmenting one training batch is denoted as $$T_i^{aug},$$

and average time for training one training batch is denoted as $$T_i^{tr}.$$

Step S13, all the tasks in an ascending order is sorted to obtain an ordered task list List $\langle task_{k_1}, task_{k_2}, \ldots, task_{k_M} \rangle$ according to the time $$T_i^{epoch}$$

required by the task $task_i$ to execute one training epoch and acquired in step S12, where in this example, it is assumed that the counted information satisfies $$T_1^{epoch} < T_0^{epoch} < T_2^{epoch},$$

the obtained list is

List <$task_1$,$task_0$,$task_2$>, each task $task_{k_i}$, i, $k_i \in [0, M)$ in the list contains a parameter $factor_{k_i}$ serving as a gain coefficient for the task to apply for a cache from a free cache pool, that is, whenever the task applies for space for one sample from a free cache pool, the free cache pool allocates ($1+factor_{k_i}$) times cache to $$Cache_{k_i}^{cur},$$

the value of $factor_{k_i}$ is inversely related to $$T_{k_i}^{epoch},$$

moreover, $factor_{k_M}=0$, and in this example, the gain coefficient of each task in the List may be set to be <0.8, 0.4, 0>.

Step 2, an average sample number of each training batch hit in a cache of each task under a default cache allocation scheme is calculated, and the expected sample number of each training batch hit in the cache of each task, where step 2 specifically includes the following substeps.

Step S21, the sample number $$n_{k_i}^d$$

of each training batch hit in the cache of each task $task_{k_1}$ under the default cache allocation scheme (namely under a system pre-allocated situation) is calculated, where an expression is:

$$n_{k_i}^d = \left\lceil \frac{N_{k_i} * C_{k_i}}{D_{k_i}} \right\rceil,$$

$D_{k_i}$ refers to the total number of the samples contained in the used data set of the task $task_{k_i}$ after sorting, $N_{k_i}$ refers to the number of the samples contained in one training batch of the task $task_{k_1}$ after sorting, and $C_{k_i}$ refers to the number of the samples stored in the system pre-allocated cache of the task $task_{k_i}$ after sorting.

Step S22, the expected sample number $$n_{k_i}^e$$

of each training batch hit in the cache of each task $task_{k_i}$ is calculated, where an expression is:

$$n_{k_i}^e = \left\lceil \frac{T_{k_i}^{io} - \max\{T_{k_i}^{aug}, T_{k_i}^{tr}\}}{T_{k_i}^{sample}} \right\rceil.$$

Figure 4:
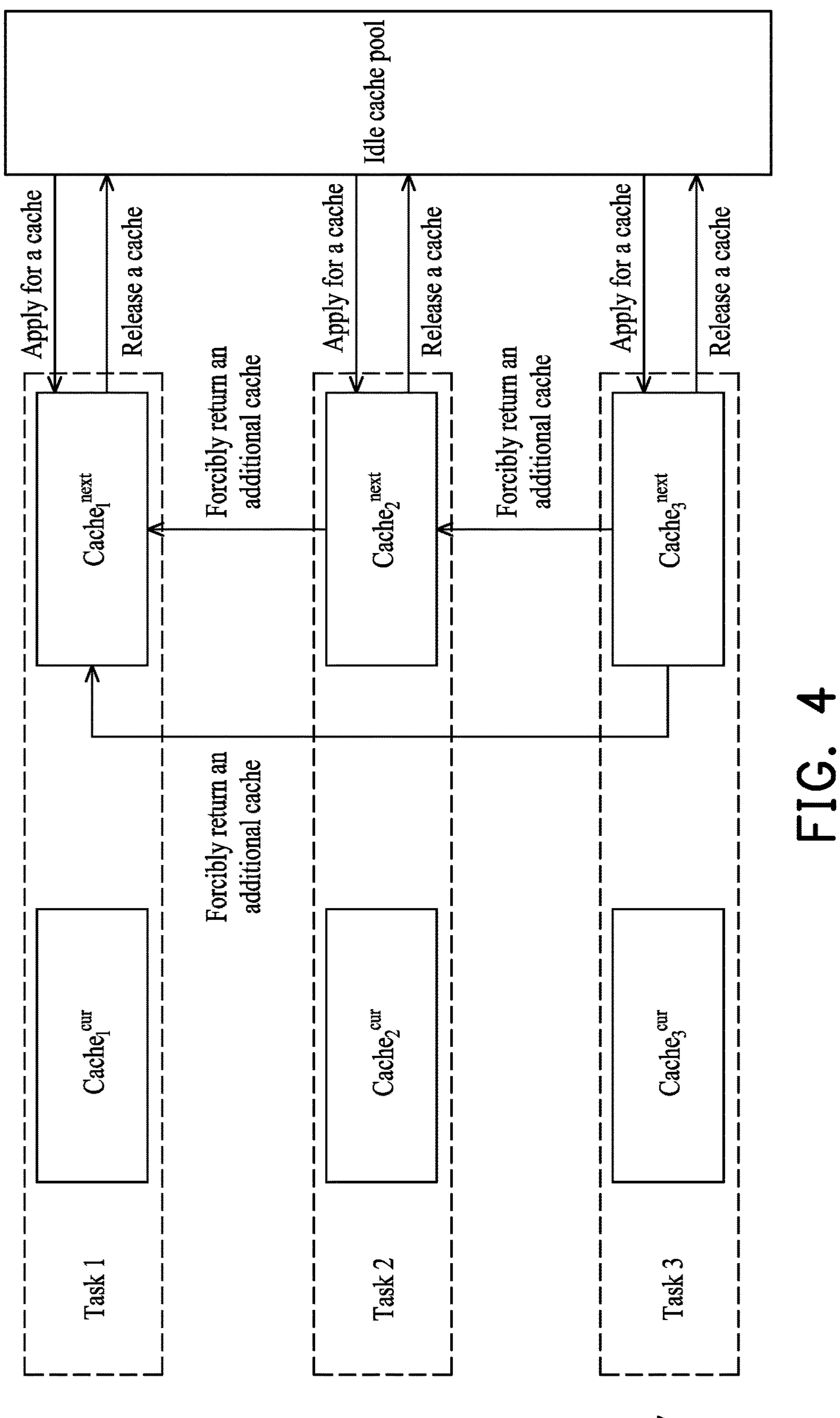
FIG. 4 is a schematic frame diagram of three concurrent tasks during use of a cache dynamic allocation and management strategy of an example of the present disclosure.

Step 3, as shown in FIG. 4, the multiple concurrent tasks concurrently execute, on the basis of the two parameters calculated in step 2, deep learning training by using a cache dynamic allocation and management strategy, where the caches of all the tasks in the multiple concurrent tasks are isolated from each other, and only the samples in the respective cache are allowed to be accessed. For each task in the current training epoch, the samples entering the cache are uniformly distributed in all training batches of the next training epoch as much as possible, the front task in the list applies for a free cache from the free cache pool at a faster speed, and when the free cache pool is empty, the rear task may forcibly request other tasks located in front of the rear task in the list to return partial cache.

Step 3 includes the following substeps.

Step S31, a global free cache pool from the free caches of the multiple concurrent tasks is formed, where the total size of the free cache pool is denoted as totalMem, the cache of each task is logically divided into two portions, denoting as $$Cache_{k_i}^{cur} \text{ and } Cache_{k_i}^{next},$$

the sample which enters the cache in the previous training epoch and is to be used in the current training epoch is stored in $$Cache_{k_i}^{cur},$$

the sample which enters the cache in the current training epoch and is to be used in the next training epoch is stored in $$Cache_{k_i}^{next},$$

and the global free cache pool totalMem in an initial situation is calculated by means of the following formula:

$$\text{totalMem} = \sum_{k_i=1}^{M} C_{k_i}.$$

Figure 5:
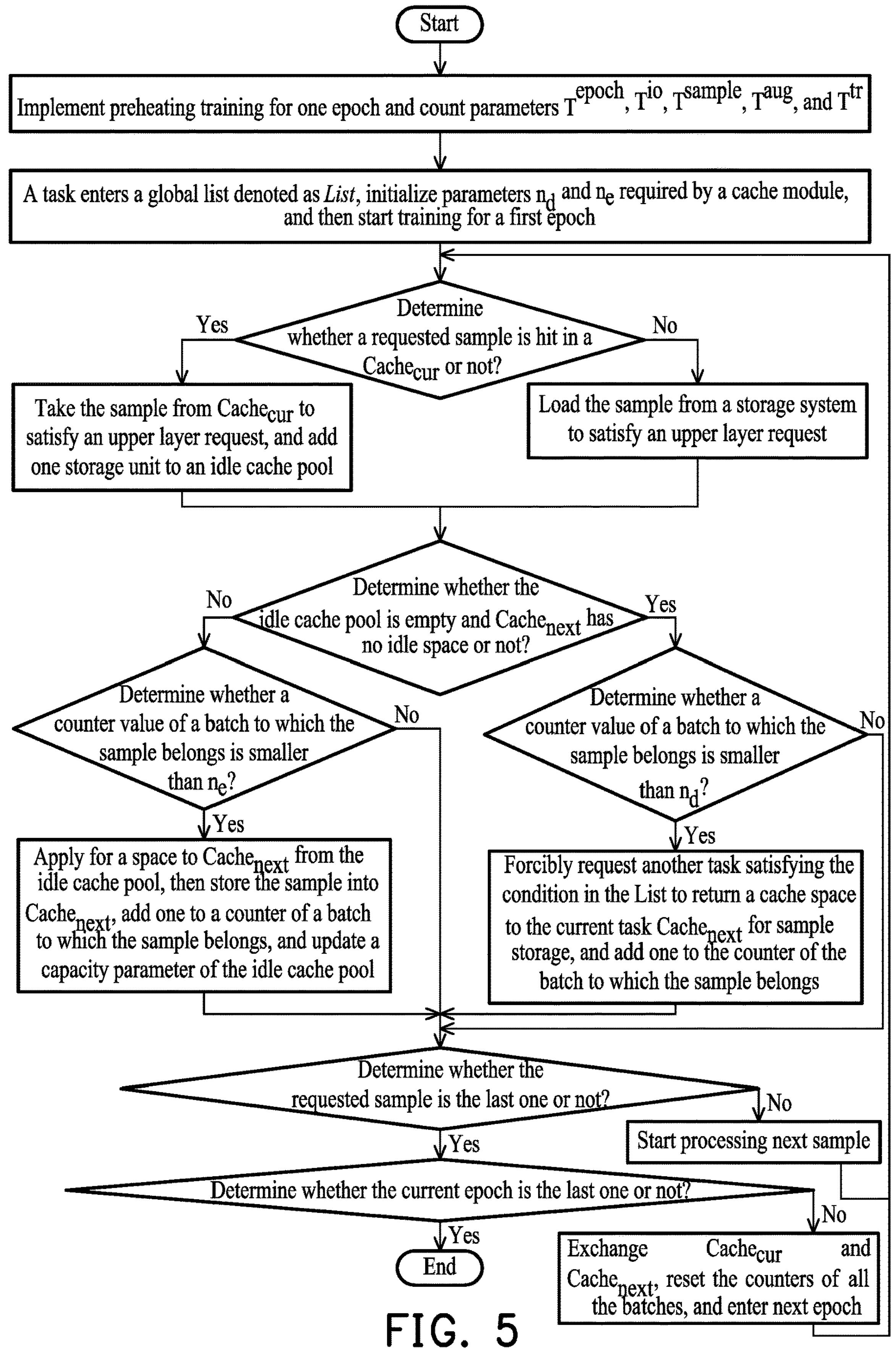
FIG. 5 is a schematic diagram of a cache processing flow of each task in multiple concurrent tasks of an example of the present disclosure.

Step S32, as shown in FIG. 5, the task $task_{k_i}$ holds two sample access sequences in each training epoch, where one sample access sequence indicates a sample access sequence in the current training epoch and is denoted as $$S_{k_i}^{cur},$$

the other sample access sequence indicates a sample access sequence in the next training epoch and is denoted as $$S_{k_i}^{next},$$

the $$S_{k_i}^{next}$$

is sequentially divided into different sequence segments from beginning to end, each segment corresponds to a training batch, each segment is configured with a counter so as to record the number of the samples entering the cache in the current training epoch of the training batch, all the counters of the task are reset when one training epoch starts, and then step S33 is executed.

Step S33, if the sample $$S_{k_i}^{cur}[j],\ j \in [0,\ D_{k_i})$$

requested by the task $task_{k_i}$ is hit in its cache $$\mathrm{Cache}_{k_i}^{cur},$$

a hit sample from $$\mathrm{Cache}_{k_i}^{cur}$$

is acquired, one is added to totalMem of the free cache pool, otherwise, the sample from the bottom layer storage system is loaded, and then step S34 is executed.

Step S34, a requested sample $$S_{k_i}^{cur}[j]$$

in the sample access sequence $$S_{k_i}^{next}$$

in the next training epoch of the task $task_{k_i}$ is retrieved, the training batch to which the requested sample $$S_{k_i}^{cur}[j]$$

belongs in the next training epoch is calculated, the training batch is denoted as $$\mathrm{batch}_{k_i}^{x},$$

then, a counter value of the training batch $$\mathrm{batch}_{k_i}^{x}$$

is acquired, and the value is denotes as $$n_{k_i}^{x},$$

and execute step S35.

Step S35, when totalMem≤0 and $$\mathrm{Cache}_{k_i}^{next}$$

has no free space, step S36 is executed, when totalMem>0, if $$n_{k_i}^{x} < n_{k_i}^{e},$$

the task $task_{k_i}$ applies for a space from the free cache pool to $$\mathrm{Cache}_{k_i}^{next}$$

according to its gain coefficient (if the cache pool is empty, application fails), then the requested sample $$S_{k_i}^{cur}[j]$$

is inserted into $$\mathrm{Cache}_{k_i}^{next},$$

then one is added to $$n_{k_i}^{x},$$

totalMem is updated, and step S38 is executed; if $$n_{k_i}^{x} \geq n_{k_i}^{e},\ s_{k_i}^{cur}[j]$$

does not enter the cache of the task $task_{k_i}$, and step S38 is executed.

step S36, if $$n_{k_i}^{x} \geq n_{k_i}^{d},$$

the requested sample $$S_{k_i}^{cur}[j]$$

does not enter the cache of the task $task_{k_i}$, and step S38 is executed; if $$n_{k_i}^{x} < n_{k_i}^{d},$$

step S37 is executed.

Step S37, if $$\mathrm{Cache}_{k_i}^{next}$$

of the task $\mathrm{task}_{k_i}$ contains a free space, the sample $$S_{k_i}^{cur}[j]$$

enters $$\mathrm{Cache}_{k_i}^{next},$$

and step S38 is executed; otherwise, if the task $\mathrm{task}_{k_i}$ is the first task (i.e. i=0) in the list List, the requested sample $$S_{k_i}^{cur}[j]$$

does not enter the cache of $\mathrm{task}_{k_i}$, and step S38 is executed; otherwise, $$\mathrm{Cache}_{k_{i-1}}^{next}$$

of the previous task $\mathrm{task}_{k_{i-1}}$ in the list List needs to provide a free space to $$\mathrm{Cache}_{k_i}^{next},$$

where if $$\mathrm{Cache}_{k_{i-1}}^{next}$$

contains a free space, the free space of one unit is directly moved to $$\mathrm{Cache}_{k_i}^{next},$$

otherwise, one of the samples in the $$\mathrm{Cache}_{k_i}^{next},$$

is randomly selected for elimination, one is subtracted from the counter of the training batch corresponding to the eliminated sample, then, the empty cache is moved to $$\mathrm{Cache}_{k_i}^{next},$$

the sample $$S_{k_i}^{cur}[j]$$

is inserted into $$\mathrm{Cache}_{k_i}^{next},$$

one is added to the counter of the corresponding training batch, and step S38 is executed.

Step S38, the requested sample $$S_{k_i}^{cur}[j]$$

of the task $\mathrm{task}_{k_i}$ enters a subsequent augmentation stage and a model training stage.

Step S39, after the task $\mathrm{task}_{k_i}$ has completed training of the current training epoch, if training of all the training periods has been completed, the task $\mathrm{task}_{k_i}$ is finished, otherwise, step S32 is executed for training of the next training epoch of the task $\mathrm{task}_{k_i}$.

Step 4, when each task enters a last training epoch, no new sample data is added to the cache of each task, moreover, with the sample data in the cache being gradually consumed, the occupied cache is gradually released, and the released cache may be used by other tasks that are not finished.

Corresponding to the example of the aforementioned data caching method for multiple concurrent deep learning training tasks, the present disclosure further provides an example of the data caching apparatus for multiple concurrent deep learning training tasks.

Figure 6:
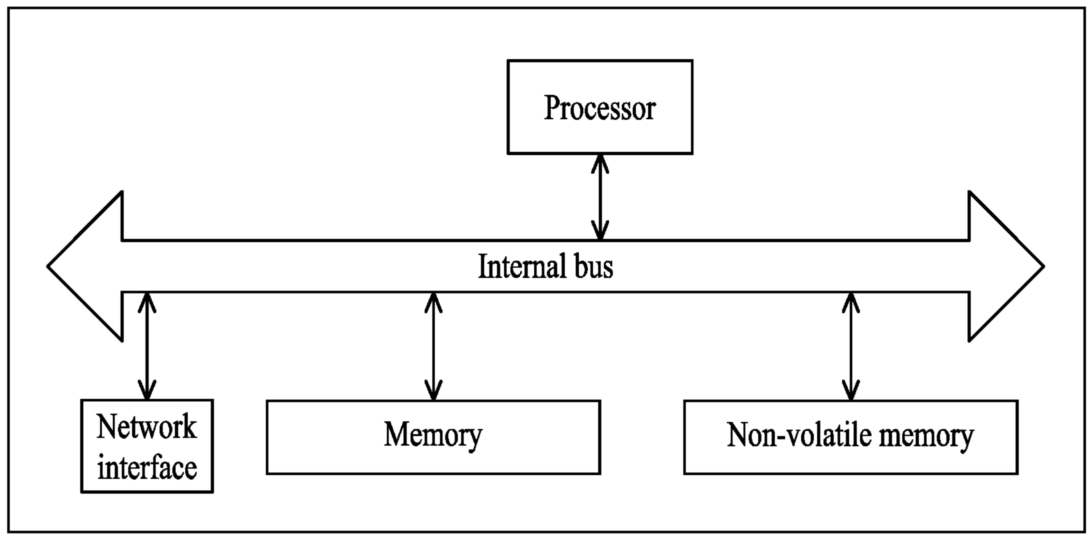
FIG. 6 is a schematic structural diagram of a data caching apparatus for multiple concurrent deep learning training tasks of an example of the present disclosure.

With reference to FIG. 6, the data caching apparatus for multiple concurrent deep learning training tasks provided by the example of the present disclosure includes one or more processors, which are configured to implement the data caching method for multiple concurrent deep learning training tasks in the aforementioned example.

An example of the data caching apparatus for multiple concurrent deep learning training tasks of the present disclosure may be applied to any device with data processing capacity, and the any device with data processing capacity may be a device or an apparatus, such as a computer. The apparatus example may be implemented by means of software, and may also be implemented by means of hardware or in a software and hardware combined manner. Taking software implementation as an instance, serving as an apparatus in a logical sense, implementation is completed by a processor of any device having data processing capacity in which the apparatus is located by reading a corresponding computer program instruction in a non-volatile memory into a memory for operation. In terms of hardware, FIG. 6 shows a hardware structural diagram of any device having data processing capacity in which the data caching apparatus for multiple concurrent deep learning training tasks of the present disclosure is located. In addition to the processor, the memory, a network interface, and the non-volatile memory shown in FIG. 6, any device with data processing capacity in which the apparatus in the example is located may generally further include other hardware according to actual capacity of the any device with data processing capacity, which will not be repeated here again.

For details of an implementation process of functions and effects of various units in the above apparatus, refer to the implementation processes of the corresponding steps in the above method, which will not repeated here again.

For the apparatus example, since it substantially corresponds to the method example, it is sufficient to refer to a part of the description of the method example where relevant. The apparatus example described above is merely schematic, where the unit described as a separate component may or may not be physically separated, and a component displayed as a unit may or may not be a physical unit, that is, the component may be located at one place, or distributed on multiple network units. Some or all of its modules may be selected according to actual needs to implement the solutions of the present disclosure. Those of ordinary skill in the art can understand and implement the present disclosure without making the inventive effort.

An example of the present disclosure further provides a computer readable storage medium having a computer program stored thereon, where the program, when executed by a processor, implements the data caching method for multiple concurrent deep learning training tasks in the above example.

The computer readable storage medium may be an internal storage unit, such as a hard disk or a memory, of any device with data processing capacity described in any one of the foregoing examples. The computer readable storage medium may also be an external storage device of a wind driven generator, such as a plug-in hard disk, a smart media card (SMC), a secure digital memory (SD) card, and a flash card arranged on the device. Furthermore, the computer readable storage medium may also further include an internal storage unit of any device having data processing capacity, and also includes an external storage device. The computer readable storage medium is configured to store the computer program and other programs and data required by the any device having data processing capacity, and may also be configured to temporarily store data that has been output or is to be output.

The above description are only preferred examples of the present disclosure and are not intended to limit the present disclosure in any form. Although the implementation process of the present disclosure is described in detail on the basis of the foregoing, those who are familiar with the art can still make modifications to the technical solutions described in various foregoing examples, or make equivalent replacement to part of its technical features. Any modifications, equivalent replacements, etc. made within the spirit and principles of the present disclosure should fall within the protection scope of the present disclosure.

What is claimed is:

1. A data caching method for multiple concurrent deep learning training tasks, comprising following steps:

step 1, independently executing preheating training for a training epoch for a sample set of each one of multiple concurrent tasks, collecting feature parameters of training batch samples, and sorting all tasks according to the collected feature parameters to generate a list;

step 2, calculating an average sample number of each training batch hit in a cache of each task under a default cache allocation scheme, and an expected sample number $$n_{k_i}^{e}$$

of each training batch hit in the cache of each task, wherein the default cache allocation scheme is a system pre-allocated cache situation;

step 3, on the basis of two parameters calculated in step 2, concurrently executing deep learning training by the multiple concurrent tasks, comprises following sub-steps:

step S31, forming a global free cache pool from free caches of the multiple concurrent tasks, wherein a total size of the global free cache pool is denoted as totalMem, the cache of each task is logically divided into a cache portion allocated for a current training epoch and a cache portion allocated for a next training epoch, denoting as $$\mathrm{Cache}_{k_i}^{cur}$$

and $$\mathrm{Cache}_{k_i}^{next},$$

a sample which enters the cache in a previous training epoch and is to be used in the current training epoch is stored in $$\mathrm{Cache}_{k_i}^{cur},$$

a sample which enters the cache in the current training epoch and is to be used in the next training epoch is stored in $$\mathrm{Cache}_{k_i}^{next},$$

and wherein the global free cache pool totalMem in an initial situation is calculated by means of following formula:

$$totalMem = \sum_{k_i=1}^{M} C_{k_i},$$

step S32, the task $task_{k_i}$ holding two sample access sequences in each training epoch, wherein one sample access sequence indicates a sample access sequence in the current training epoch and is denoted as $$S_{k_i}^{cur},$$

the other sample access sequence indicates a sample the access sequence in the next training epoch and is denoted as $$S_{k_i}^{next},$$

the $$S_{k_i}^{next}$$

is sequentially divided into different sequence segments from beginning to end, each segment corresponds to a training batch, each segment is configured with a counter so as to record a number of the samples entering the cache in the current training epoch of the training batch, all counters of the task are reset when one training epoch starts, and then step S33 is executed;

step S33, if the sample $$S_{k_i}^{cur}[j],\ j \in [0, D_{k_i})$$

requested by the task $task_{k_i}$ is hit in its cache $$Cache_{k_i}^{cur},$$

acquiring a hit sample from $$Cache_{k_i}^{next},$$

adding one to totalMem of the free cache pool, otherwise, loading the sample from a bottom layer storage system, and then executing step S34;

step S34, retrieving a requested sample $$S_{k_i}^{cur}[j]$$

in the sample access sequence $$S_{k_i}^{next}$$

in the next training epoch of the task $task_{k_i}$, calculating the training batch to which the requested sample $$S_{k_i}^{cur}[j]$$

belongs in the next training epoch, denoting the training batch as $$batch_{k_i}^{x},$$

then, acquiring a counter value of the training batch $$batch_{k_i}^{x},$$

and denoting the value as $$n_{k_i}^{x},$$

and executing step S35;

step S35, when totalMem≤0 and $$Cache_{k_i}^{next}$$

has no free space, executing step S36, when totalMem>0, if $$n_{k_i}^{x} < n_{k_i}^{e},$$

the task $task_{k_i}$ applying for a space from the free cache pool to $$Cache_{k_i}^{next}$$

according to its gain coefficient (if the cache pool is empty, application fails), then inserting the requested sample $$S_{k_i}^{cur}[j] \text{ into } Cache_{k_i}^{next},$$

then adding one to $$n_{k_i}^{x},$$

updating totalMem, and executing step S38; if $$n_{k_i}^{x} \geq n_{k_i}^{e},\ S_{k_i}^{cur}[j]$$

not entering the cache of the task $task_{k_i}$, and executing step S38;

step S36, if $$n_{k_i}^{x} \geq n_{k_i}^{d},$$

the requested sample $$S_{k_i}^{cur}[j]$$

not entering the cache of the task $task_{k_i}$, and executing step S38; if $$n_{k_i}^{x} < n_{k_i}^{d},$$

executing step S37;

step S37, if $$\mathrm{Cache}_{k_i}^{next}$$

of the task $\mathrm{task}_{k_i}$ contains a free space, the sample $$S_{k_i}^{cur}[j]$$

entering $$\mathrm{Cache}_{k_i}^{next},$$

and executing step S38; otherwise, if the task $\mathrm{task}_{k_i}$ is a first task (i.e. i=0) in the list List, the requested sample $$S_{k_i}^{cur}[j]$$

not entering the cache of task $\mathrm{task}_{k_i}$, and executing step S38; otherwise requiring $$\mathrm{Cache}_{k_{i-1}}^{next}$$

of a previous task $\mathrm{task}_{k_{i-1}}$ in the list List to provide a free space to $$\mathrm{Cache}_{k_i}^{next},$$

specifically, if $$\mathrm{Cache}_{k_{i-1}}^{next}$$

contains a free space, directly moving the free space of one unit to $$\mathrm{Cache}_{k_i}^{next},$$

otherwise, randomly selecting one of the samples in the $$\mathrm{Cache}_{k_{i-1}}^{next}$$

for elimination, subtracting one from the counter of the training batch corresponding to the eliminated sample, then, moving an empty cache to $$\mathrm{Cache}_{k_i}^{next},$$

inserting the sample $$S_{k_i}^{cur}[j] \text{ into } \mathrm{Cache}_{k_i}^{next},$$

adding one to the counter of the corresponding training batch, and executing step S38;

step S38, the requested sample $$S_{k_i}^{cur}[j]$$

of the task $\mathrm{task}_{k_i}$ entering a subsequent augmentation state and a model training state; and step S39, after the task $\mathrm{task}_{k_i}$ has completed training of the current training epoch, if training of all training periods has been completed, ending the task $\mathrm{task}_{k_i}$, otherwise, executing step S32 for training of the next training epoch of the task $\mathrm{task}_{k_i}$; and step 4, when each task enters a last training epoch, adding no new sample data to the cache of each task, moreover, with the sample data in the cache being gradually consumed, gradually releasing occupied cache, and making the released cache to be used by other tasks that are not finished.

2. The data caching method for multiple concurrent deep learning training tasks according to claim 1, wherein step 1 specifically comprises following substeps:

step S11, acquiring an initial parameter configuration, wherein a total number of the concurrent tasks is denoted as M, for the tasks $\mathrm{task}_i$, $i \in [0, M)$ therein, the total number of samples contained in a used data set is denoted as $D_i$, the number of samples contained in one training batch is denoted as $N_i$, and the maximum number of samples that are stored in a system pre-allocated cache is denoted as $C_i$;

step S12, since preheating training does not use any cache, when preheating training of each task is completed, counting information thereof, wherein time required by the task $\mathrm{task}_i$ to independently execute one training epoch is denoted as $$T_i^{epoch},$$

I/O average time for loading one training batch is denoted as $$T_i^{io},$$

average time for loading one sample is denoted as $$T_i^{sample},$$

average time for augmenting one training batch is denoted as $$T_i^{aug},$$

and average time for training one training batch is denoted as $$T_i^{tr};$$

and step S13, sorting all the tasks in an ascending order to obtain an ordered task list according to the time $$T_i^{epoch}$$

required by the task $task_i$ to execute one training epoch and acquired in step S12:

List<$task_{k_1}$, $task_{k_2}$, . . . , $task_{k_M}$>, wherein each task $task_{k_i}$, i, $k_i \in [0, M)$ in the list contains a parameter $factor_{k_i}$ serving as a gain coefficient for the task to apply for cache from a free cache pool, that is, whenever the task applies for space for one sample from the free cache pool, the free cache pool allocates $(1+factor_{k_i})$ times cache to the task, moreover, the value of $factor_{k_i}$ is inversely related to $$T_{k_i}^{epoch},$$

and $factor_{k_M}=0$.

3. The data caching method for multiple concurrent deep learning training tasks according to claim 2, wherein step 2 specifically comprises following substeps:

step S21, calculating the sample number $$n_{k_i}^d$$

of each training paten nit in the cache of each task $task_{k_i}$ under the default cache allocation scheme, wherein an expression is:

$$n_{k_i}^d = \left\lceil \frac{N_{k_i} * C_{k_i}}{D_{k_i}} \right\rceil,$$

$D_{k_i}$ refers to the total number of the samples contained in the used data set of the task $task_{k_i}$ after sorting, $N_{k_i}$ refers to the number of the samples contained in one training batch of the task $task_{k_i}$ after sorting, and $C_{k_i}$ refers to the number of the samples stored in the system pre-allocated cache of the task $task_{k_i}$ after sorting; and step S22, calculating the expected sample number $$n_{k_i}^e$$

of each training batch hit in the cache of each task $task_{k_i}$, wherein an expression is:

$$n_{k_i}^e = \left\lceil \frac{T_{k_i}^{io} - \max\{T_{k_i}^{aug}, T_{k_i}^{tr}\}}{T_{k_i}^{sample}} \right\rceil.$$

4. The data caching method for multiple concurrent deep learning training tasks according to claim 1, wherein the caches of all the tasks in the multiple concurrent tasks are isolated from each other, and only the samples in the respective cache are allowed to be accessed.

5. The data caching method for multiple concurrent deep learning training tasks according to claim 2, wherein for each task in the current training epoch, a front task in the list applies for a free cache from the free cache pool at a faster speed, and when the free cache pool is empty, a rear task is allowed to forcibly request other tasks located in front of the rear task in the list to return partial cache.

6. A data caching apparatus for multiple concurrent deep learning training tasks, comprising one or more processors, and being configured to implement the data caching method for multiple concurrent deep learning training tasks according to claim 1.

7. A non-transitory computer readable storage medium, having a program stored thereon, wherein the program implements, when executed by a processor, the data caching method for multiple concurrent deep learning training tasks according to claim 1.

* * * * *